Nov. 30, 1965  J. H. COTTON  3,221,089
METHOD FOR CAPACITOR FABRICATION
Filed July 1, 1960  3 Sheets-Sheet 1
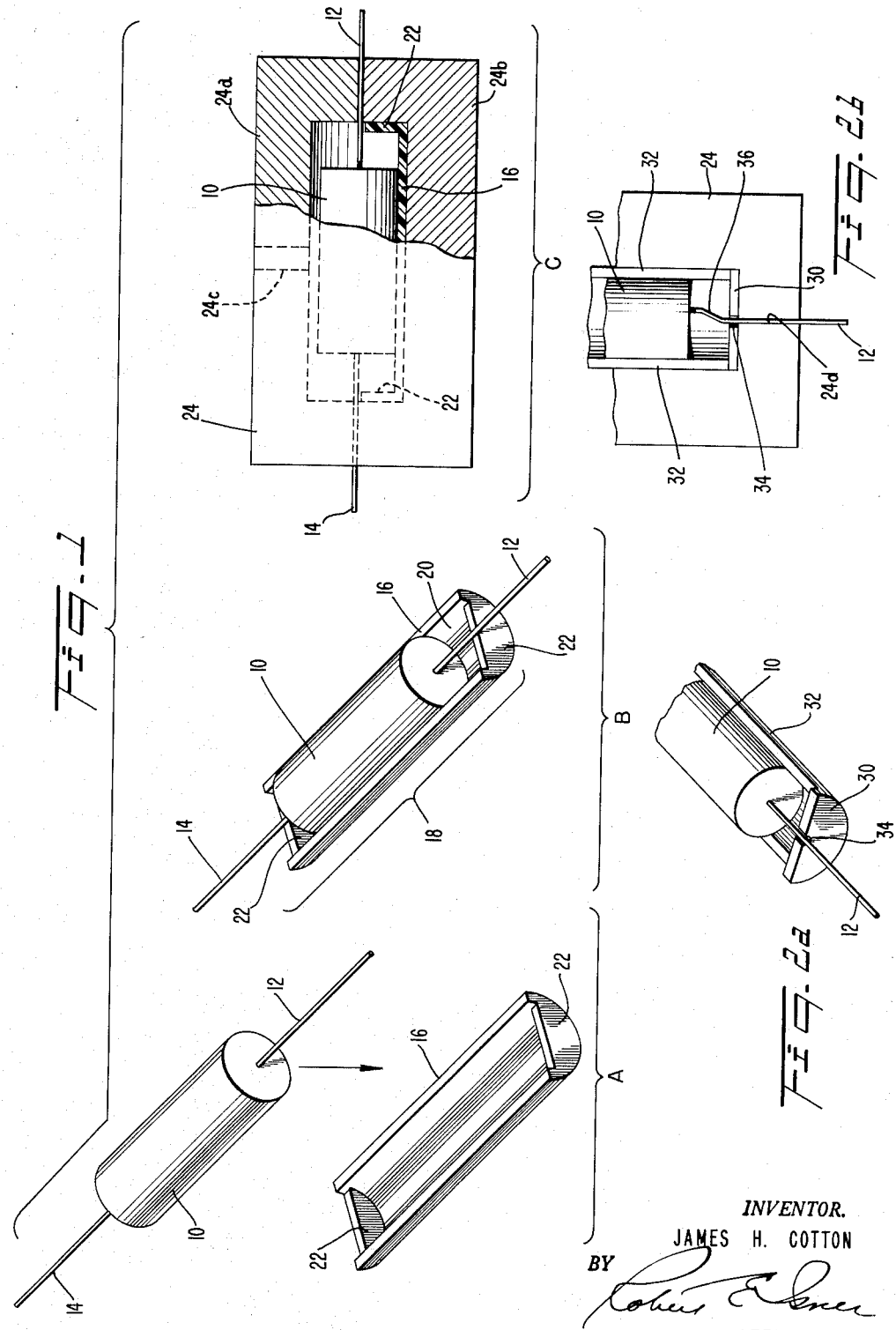
INVENTOR.
JAMES H. COTTON
BY
ATTORNEY Nov. 30, 1965     J. H. COTTON     3,221,089
METHOD FOR CAPACITOR FABRICATION
Filed July 1, 1960     3 Sheets-Sheet 2
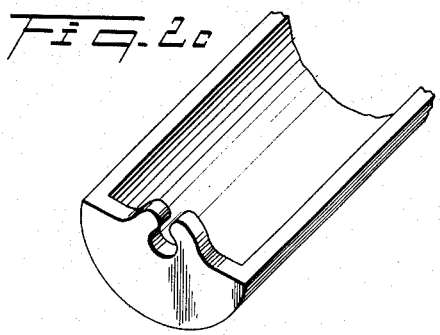
Fig. 2c
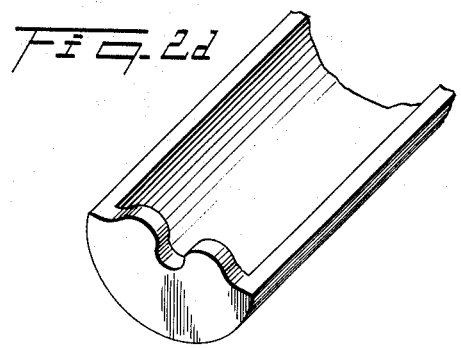
Fig. 2d
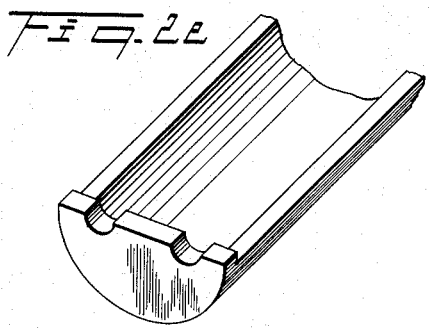
Fig. 2e
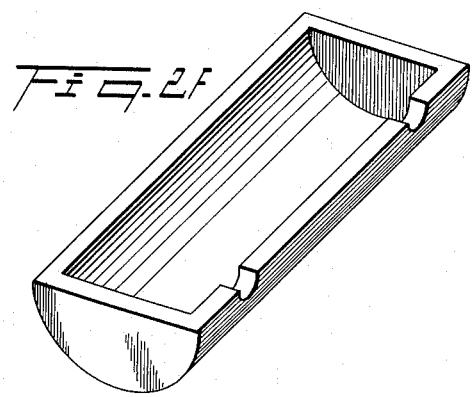
Fig. 2f
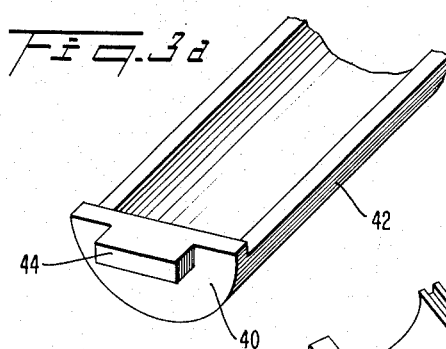
Fig. 3a
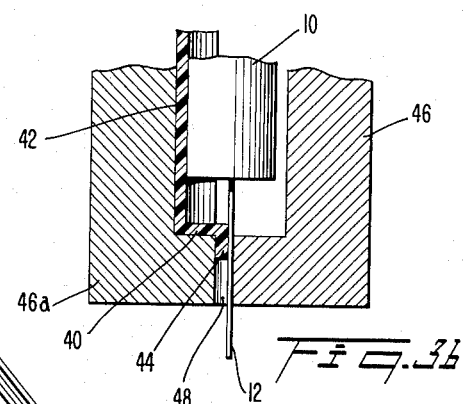
Fig. 3b
Fig. 3c
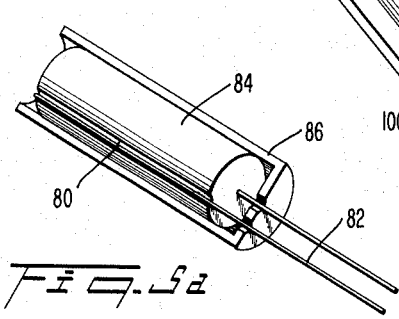
Fig. 3d
INVENTOR.
JAMES H. COTTON
BY
ATTORNEY

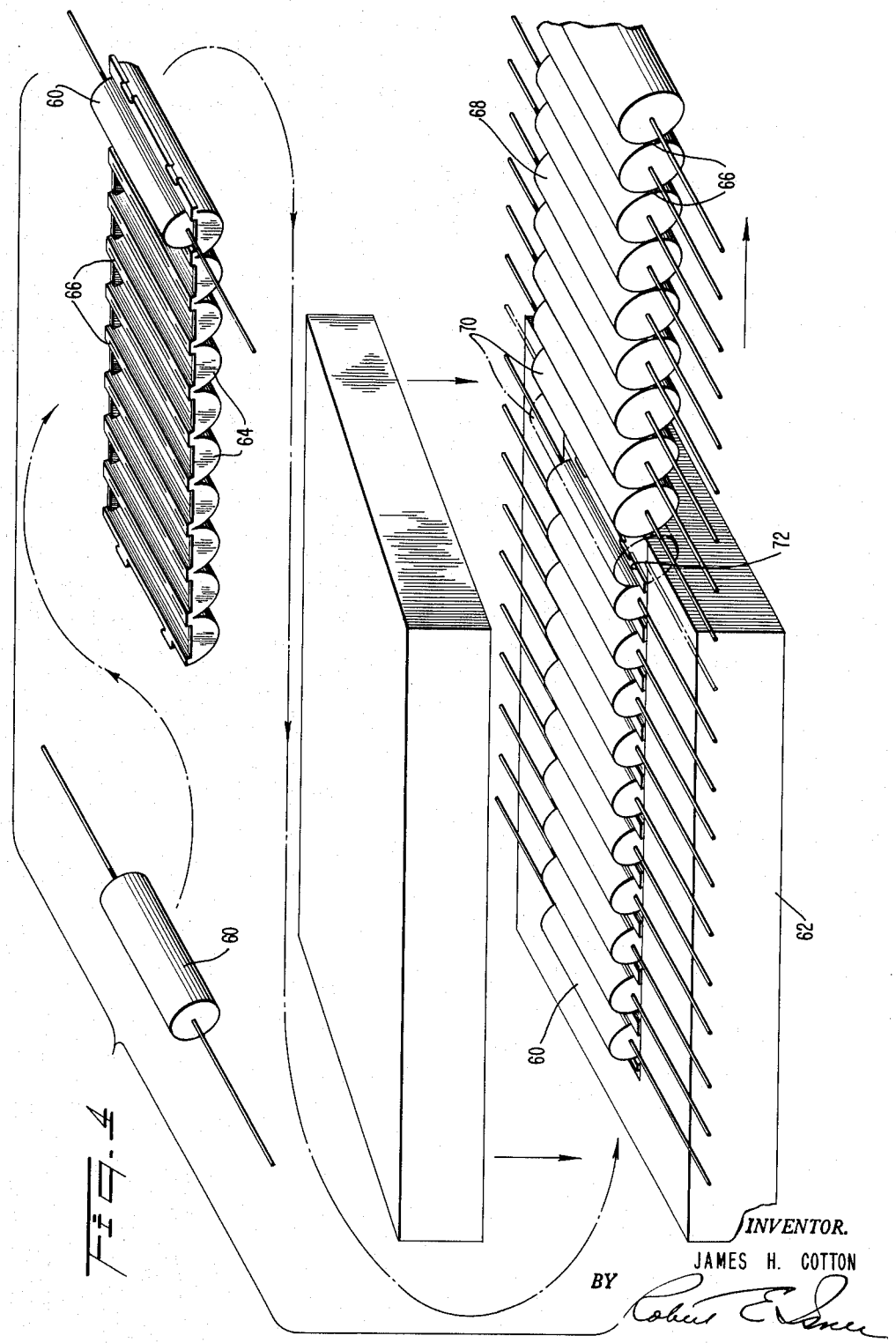

United States Patent Office 3,221,089
Patented Nov. 30, 1965

3,221,089
METHOD FOR CAPACITOR FABRICATION
James H. Cotton, 3 Kent Court, Queens Drive,
London, England
Filed July 1, 1960, Ser. No. 40,392
6 Claims. (Cl. 264—261)

This invention relates to an improved method for producing encapsulated electrical components, such as capacitors and resistors, that are efficiently sealed against ingress of moisture.

In the capacitor field, the competitive pressures have created a continual demand for the development of better quality and lower cost tubular units wherein the capacitor section is formed of convolutely wound interleaved dielectric and conducting elements.

This invention may be briefly described as an improved method for fabricating encapsulated capacitors of the tubular type wherein an unencapsulated component is properly positioned relative to the walls of a mold by utilization of a selectively shaped interposed insulating means and wherein encapsulation is effected by introduction of compatible liquid casing material into said mold to fill all voids therewithin and to merge, upon solidification, with the insulating means and form a unitary enclosed casing for said component. Other aspects of the herein disclosed invention include the provision of a manufacturing method that is peculiarly adapted for automation techniques and for automatic or semi automatic fabrication operation on a mass production basis.

Among the advantages of the herein disclosed invention is the provision of uniformly encapsulated capacitors of high quality at a comparatively lower cost and which results in a materially reduced and minimal number of rejected units for defective casings or for other faults such as defective sealing of the extending terminal leads. Other advantages, which will be apparent to those skilled in this art, are the avoidance of capacitor section displacement within the mold during molding operations with consequent variations in casing thickness with its inherent deficiencies, the minimization of manipulative fabrication operations, the readily permitted simultaneous fabrication of a plurality of units by automated mass production fabrication techniques, the utilization of inexpensive and readily available materials and the production of finished products in arrangements that facilitate testing, packaging and ready use for continuous assembly operations in the fabrication of electronic equipment.

The object of the invention is to provide an economical and improved method of encapsulating an electrical component whereby a highly efficient seal against ingress of moisture is obtained around the component and any terminals projecting therefrom whilst minimizing risk of damage to the component.

Other objects and advantages of the invention will be pointed out in the following disclosure and claims and will be apparent from the accompanying drawings which disclose, by way of illustrative example, the principles underlying the invention and provide, by way of schematic representation, the essentials of suitable apparatus by which said principles may be usefully employed in the commercial manufacture of tubular capacitors.

Referring to the drawings:

FIGURE 1 is a schematic drawing, in the nature of a flow diagram, illustrative of a fabrication method incorporating the principles of this invention;

FIGURES 2a, 2b, 2c, 2d and 2e are oblique fragmentary views of various end wall configurations for the partial sleeve insulating means. FIGURE 2f is an illustration of a side wall configuration for a partial sleeve insulating means;

FIGURE 3a is an oblique fragmentary view of still another end wall configuration and FIGURE 3b illustrates the disposition thereof in a separable mold;

FIGURE 4 is a schematic flow diagram illustrative of utilization of the method of the invention in the mass production of encapsulated capacitors;

FIGURES 5a and 5b are schematic illustrations of varying insulating sleeve means.

By way of general introduction, the fabrication method forming the subject matter of this invention includes the utilization of selectively shaped insulating locating means in the form of a partial sleeve sized and shaped to partially surround at least an unencapsulated component, such as a convolutely wound tubular capacitor to thereby properly position the same relative to the walls of a mold. Such insulating locating means should be of a length sufficient to extend beyond the ends of the component a sufficient distance to assure proper depth of casing material at the terminal ends thereof and should be shaped to provide desired terminal lead alignment relative to the mold terminal lead receiving channels to minimize, if not prevent, terminal lead deformation during the molding operation. With an unencapsulated component and the insulating locating means properly positioned in a mold, a compatible liquid insulating casing material of a thermoplastic nature is injected therein at a temperature at or above its setting temperature so that it will merge or bond with the insulating locating means and, upon solidification, will harden into an integral unitary encapsulation surrounding the electrical component and the extending terminal leads thereof. Conveniently the insulating locating means and the injected liquid preferably should be of the same material.

The above described method can be readily employed in the mass production of encapsulated electrical components. In one such method the mold may be conveniently sized to simultaneously accommodate a plurality of unencapsulated components with individual insulating locating means with such mold being shaped to provide for joinder of the encapsulated units as by a thin web of interconnecting molding material. Alternatively the insulating locating means may be preformed into an interconnected array and the mold suitably shaped to receive the same. A preferred arrangement thereof includes utilization of a preformed strip of partial sleeves joined by means of a thin web or webs between the adjacent edges of adjacent partial sleeves, whereby, after molding, such batch of components emerges from the mold with the encapsulations of adjacent components joined by such thin web or webs.

Conveniently, any of these methods of mass production may be modified to employ a mold of a size and design simultaneously to accommodate a batch of components for individual encapsulation and also to receive the end component of a batch previously encapsulated, such batch of components emerging from the mold with the encapsulation of one end component joined by the insulating molding material to the encapsulation of the end component of the batch previously encapsulated. In this way, a continuous series of encapsulated components can be produced.

The invention may be carried into practice in various ways but the following may be instanced as some convenient alternative methods of producing sealed components according thereto, for convenience with reference to the production of sealed electrical capacitors of the rolled kind, the capacitor element to be encapsulated consisting, for example, of interleaved dielectric and conducting layers wound spirally into a roll with terminals connected to the conducting layers which constitute the capacitor electrodes.

With most capacitors of this kind, it is preferred for the terminals to be connected to the capacitor electrodes (or terminal tabs connected thereto) at opposite ends of the roll so as each to extend either axially or radially with respect to the axis of the roll. Sometimes however, for example in capacitors for use with printed circuits, the terminals may both be connected at one end of the roll to extend parallel to the axis of the roll.

In one preferred method for the encapsulation of a capacitor element, as schematically illustrated in FIGURE 1, a tubular convolutely wound capacitor section 10 having longitudinally extending terminal leads 12, 14, as illustrated at A, is inserted into a semi-circularly shaped partial sleeve 16, which is sized to fit relatively closely around the section 10, to form a preliminarily encased capacitor section 18, as illustrated at B. The partial sleeve 16 is conveniently made of an insulating thermoplastic material such as, for example, polyethylene, polypropylene or nylon, and is of sufficient length to project beyond each end of the section 10, as at 20, to provide for additional casing thickness at the terminal ends of finished encapsulated unit, as well as, as will be explained later, to provide a locus for preliminary terminal deformation for terminal lead alignment purposes. The wall thickness of the partial sleeve 16 is preselected so as to provide for at least a minimal thickness of effective insulation, efficient sealing and good mechanical strength of the encapsulated component. At its ends the parallel sleeve 16 is provided with end walls 22 sized so that the axially extending terminals pass over the upper edge thereof.

The preliminarily encased capacitor section 18, as illustrated at B, is then placed in a mold 24 shaped and sized to match the partial sleeve 16, so that the final encapsulation is of substantially even thickness around the capacitor section 10, the partial sleeve 16 appropriately spacing the section 10 from the walls of the mold 24 for this purpose. As illustrated, the mold 24 is conveniently formed of separable upper and lower parts 24a and 24b having suitable grooves or recesses therein to closely accommodate the extending terminal leads 12, 14 to assure that the mold is substantially sealed upon closure thereof. With the preliminarily encased section so positioned, an insulating molding material, for example, a thermoplastic material the same as that from which the sleeve is made, is then injected into the mold 24. Such molding material is introduced into the mold at a temperature above its hardening or solidifying temperature so that it flows readily into all the unoccupied space within the mold. Ready flow of liquid encasing material is facilitated by the ample free space within the mold above and at the ends of the capacitor section 10 which also permits the release of air which might otherwise become trapped in the finished molding. The liquid encasing material is preferably injected into the mold 24 at a point at or adjacent the center of the free space, as indicated at 24c. Endwise movement of the capacitor section 10 relative to the partial sleeve 16, if such occurs, is limited by the ends walls 22 which thus insures at least minimal spacing of the capacitor end faces from the mold walls and at least a consequent minimal desired encapsulation thickness to provide an efficient seal about the terminal leads in a finished and encapsulated unit. The temperature of the mold during the molding process is below the hardening or solidifying temperature of the molding material, but preferably is at a sufficiently high temperature to ensure that the molding material cools only relatively slowly. This helps to ensure that all the free space within the mold is completely filled. The hot thermoplastic molding material merges readily with the exposed parts of the sleeve 16 of the same or compatible thermoplastic material so as to form an effectively integral encapsulation on cooling.

The positions and orientations of the terminals are not disturbed by the molding process, so that if correctly positioned on insertion into the mold, such terminals will project correctly from the encapsulation. It is often highly desirable, for example, in an encapsulated capacitor from which the terminals project axially at opposite ends, for such terminals to project with some accuracy along the axis of the capacitor. This enables the terminals to be used for centering the capacitor, for example in machinery which feeds the capacitors automatically into their positions in electrical circuits, for example printed circuits.

As illustrated above, it will usually be convenient to employ a mold formed of two separable halves having suitable lead securing recesses at the interface to accommodate the terminal leads of the component. Often, however, the position of the terminal leads will vary to a limited extent from one unencapsulated component to another. Such limited variation can be such as to result in damage to the leads due to compression thereof intermediate the mold interface when the same are disposed at locations other than the lead accommodating recesses therein.

Desired alignment of the extending terminal leads relative to closely fitting terminal lead receiving apertures in the mold interface may be readily effected by selective contouring of the end walls of the partial sleeve insulating means. As shown in FIGURE 2a, the end wall 30 of a partial sleeve insulating means 32 is provided with a lead receiving recess 34 centered on the longitudinal axis of the sleeve to properly locate the terminal lead 12 of a capacitor section 10 positioned therein. FIGURE 2b illustrates the utilization of said recess 34 to properly position a lead 12 relative to the lead accommodating mold aperture 24d, when the lead 12 is not properly located axially of the capacitor section 10. In such case, where the terminal does not project along the axis of the section 10, the terminal is readily bent or deformed as at 36 in the space intermediate the end of the section 10 and the end wall 30 of the partial sleeve 32. When disposed in the mold 24, the recess 34 in the end wall 30 is precisely aligned with the lead receiving aperture 24d so that the exact positioning of the terminal 12 by means of the partial sleeve 32 insures that the terminal will be disposed in the aperture 24d and thus project axially of the encapsulated unit. Such axial terminal lead projection permits centering utilization thereof as for example in automatic machines which feed the finished units in automatic circuit fabrication.

FIGURES 2c and 2d schematically illustrate other possible configuration for the end wall portions of partial sleeves to effect terminal lead location relative to the terminal lead accommodating recess in a mold. FIGURES 2e and 2f illustrate partial sleeve configuration to accommodate capacitor sections having a pair of terminals longitudinally extending from one end thereof and radially extending terminal leads, respectively.

FIGURES 3a and 3b illustrate an alternate end wall configuration for the partial sleeve insulating means. As shown in FIGURE 3a, the end wall 40 of a partial sleeve 42 is provided with an outward projection 44. In association with such sleeve 42 is employed a mold 46 (see FIGURE 3b) having a rectangular hole 48 adapted to engage, at its inner end, the projection 44 of the partial sleeve 42. Each rectangular hole 48 is made conveniently about three times as wide (across the mold) as the diameter of the terminal wire 12 and has a depth of about one and one half times each diameter and each projection 44 being of a corresponding size so that the holes 48 are effectively sealed during the molding process. The holes 48 in the mold are thus wide enough for the terminals 12 to be received therein when the separable parts of the mold 46 are brought together notwithstanding any lack of centralization of such terminals with respect to the component located in the mold by means of a partial sleeve 42. The holes 48 are preferably formed wholly as recesses in the wall of the lower part 46a of the mold 46.

The terminal 12 may be conveniently pressed into the projection 44 by means of a hot tool prior to mold closure.

It will be apparent to those skilled in this art, that for capacitor sections having radially extending terminal leads an elongate partial sleeve may be employed for simultaneously locating two or more capacitor elements in a larger mold with the capacitor elements being spaced apart along the length of the sleeve. Molding is carried out in the same manner as that previously described, the insulating molding material filling all the unoccupied space in the mold including the spaces between adjacent capacitor elements in the sleeve. The resulting encapsulated body is then cut at appropriate positions along its length to sever the individual components from one another.

The above described examples of the method have related, in the main, to the encapsulation of a single capacitor section, although mention has been made of the use of a larger mold for housing an elongated partial sleeve for simultaneously locating a plurality of elements which have radially extending terminals in the mold. The method of the invention, however, is peculiarly adapted to the mass fabrication of encapsulated sections having longitudinally extending terminal leads.

As shown in FIGURE 4 a suitable method, incorporating the principles of this invention, for simultaneously encapsulating each of a batch of capacitor elements having axially extending terminals 32, employs a mold suitable for simultaneously accommodating such batch of capacitor elements, in spaced parallel relationship to one another. For locating the elements 60 of the batch in the mold 62, a corresponding number of partial sleeves 64 of a semicircular cross-section are employed, such partial sleeves 64 being preferably joined together in a length by means of a thin connecting web or webs 66 between the adjacent edges of each pair of adjacent partial sleeves 64. Molding is carried out in the manner previously described. The batch of encapsulated components 68 emerges from the mold 62 with the individual encapsulations of adjacent capacitors joined in a length and interconnected by the thin web or webs 66. The encapsulated capacitors may be severed from one another immediately or alternatively be left in their joined condition until they are to be used. It will be clear that instead of using as means for locating the elements in the mold a length of connected partial sleeves, separate partial sleeves may be employed, in which case the encapsulated capacitors will emerge separately. It is, however, preferred for the capacitors to emerge from the mold joined together, since the length can be used in automatic insertion equipment for printed circuits, for example after being wound into a roll. To effect this, a mold is employed which, in addition to accommodating the capacitors of a single batch, will also accommodate the end capacitors of a single batch, will also accommodate the end capacitor 70 of a batch previously encapsulated. During the molding process, the webs of the encapsulation of the end capacitor 70 of the previously encapsulated batch 68 and of the partial sleeve of the adjacent capacitor element undergoing molding become bonded together as at 72 to join the two capacitor lengths together. In this way, a continuous series of encapsulated capacitors can be produced if desired. It will be appreciated that, in the method above described, the mold 62 is provided with recesses for accommodating the joining webs of the partial sleeves. Further, if desired, instead of the partial sleeves being initially joined, the molding material itself may be used to join the adjacent capacitor encapsulations with a thin web or webs.

It is sometimes necessary that an encapsulated electrical component shall have two terminals projecting from one end thereof, for example for use with printed circuits. For this purpose, it is often desirable to bring the terminal from one end of the component itself through the encapsulation so that both terminals project from one end of the encapsulation. For this purpose, the partial sleeve insulating locating means may be associated with means for receiving one of such terminals so as to guide such terminal from one end of the component to the other, such guide means being of a material with which the insulating means will bond so that, after molding has been effected, the two terminals project in spaced relationship from one end of the encapsulation. For example, as shown in FIGURE 5a, such guide means may consist of a narrow tube 80 through which the terminal lead 82 from one end of the component 84 is threaded. As illustrated in FIGURE 5c, a partial sleeve 100 may be provided with a deep groove 102 in one edge of the partial sleeve sized to contain the terminal lead.

The encapsulated capacitors attained by employment of the herein described fabrication methods has high insulation resistance and good mechanical strength in addition to being very effectively sealed against ingress of moisture.

Capacitors constructed in accordance with the methods herein described have been subjected to a stringent tropical exposure test by enclosing them in a chamber wherein the temperature is varied cyclically between 20 degrees and 30 degrees centigrade, the relative humidity in such chamber being maintained at a minimum of 95 percent. These capacitors showed no appreciable change in their electrical characteristics after a period of many months, and in particular their insulation resistances remained unaffected. In contrast thereto, capacitors having similarly constructed elements but encapsulated by other methods, in general more difficult to carry out and more expensive than the methods described herein, showed deterioration after only fourteen days of subjection to the same tropical exposure test.

Having thus described my invention, I claim:

1. In a method of fabricating encapsulated electrical components having a generally cylindrically shaped body portion with terminal leads extending therefrom, the steps of positioning the body portion of an unencapsulated component in spaced relation to a cylindrically shaped mold cavity and the extending terminal leads thereof relative to the cavity defining mold walls by interposition of an end walled terminal lead positioning semi-cylindrically shaped insulating means intermediate said component and the mold cavity surfaces of a thickness at least equal to the minimal desired depth of encapsulation, closing said mold cavity by superposition of a complementally shaped mold cavity thereover and introducing compatible liquid thermoplastic encasing material into said closed mold to fill all voids therewithin and to merge, upon solidification thereof, with said insulating means to form a unitary enclosed casing having said component substantially uniformly centered therewithin.

2. In a method of fabricating encapsulated electrical components having a generally cylindrically shaped body portion with terminal leads extending therefrom, the steps of positioning the body portions of a plurality of unencapsulated components with their longitudinal axes disposed in parallel aligned array in spaced relation to a plurality of cylindrically shaped mold surfaces in a multicavity mold and with the extending terminal leads thereof positioned relative to the cavity defining mold walls by interposition of interconnected end walled terminal lead positioning semi-cylindrically shaped insulating means intermediate said components and said mold surfaces of a thickness at least equal to the minimal desired depth of encapsulation, closing said multicavity mold by interposition of a complementally shaped multicavity mold thereover and introducing compatible liquid thermoplastic encasing material into said mold to fill all voids therewithin and to merge, upon solidification thereof, with said insulating means to form a series of interconnected individually encased electrical components each being substantially uniformly centered within its encasing encapsulating material.

3. In a method of fabricating encapsulated electrical components, the steps of sequentially introducing unencapsulated electrical components in an advanceable web of interconnected selectively shaped end walled insulating means of a thickness at least equal to the minimal desired depth of encapsulation, introducing said component supporting insulating means into a mold cavity, closing said mold cavity by superposition of a complementally shaped mold cavity thereover and introducing compatible liquid encasing material into said closed mold to fill all voids therewithin and to merge, upon solidification thereof, with said insulating means to form a continuous series of interconnected individually encased electrical components each being substantially uniformly centered within its encasing encapsulating material.

4. In a method of fabricating encapsulated electrical components having a generally cylindrically shaped body portion with terminal leads extending therefrom, the steps of sequentially positioning the body portions of a series of said cylindrically shaped unencapsulated electrical components in selective spaced relation to a mold cavity surface and the extending terminal leads thereof relative to the cavity defining mold walls by interposition of individual interconnected end walled terminal lead positioning semi-cylindrically shaped insulating means intermediate said component and the mold cavity surface of a thickness at least equal to the minimal desired depth of encapsulation, closing said mold cavity by superposition of a complementally shaped mold cavity thereover and introducing compatible liquid encasing material into said closed mold to merge, upon solidification thereof, with said insulating means to form a series of individual interconnected encased components each being substantially uniformly centered within its encasing encapsulating material.

5. In a method of fabricating encapsulated electrical components having terminal leads extending therefrom, the steps of positioning a plurality of unencapsulated electrical components in spaced relation to a multicavity mold surface and with the extending terminal leads thereof positioned in predetermined relation to the cavity defining mold walls by interposition of selectively shaped interconnected end walled terminal lead positioning insulating means intermediate said component and the multicavity mold surfaces of a thickness at least equal to the minimal desired depth of encapsulation, closing said mold by superposition of a complementally shaped multicavity mold surface thereover and introducing compatible liquid encasing material into said mold to merge, upon solidification thereof, with said insulating means to form unitary individual enclosed interconnected casings for said components each being substantially uniformly centered within its encasing encapsulating material.

6. In a method of fabricating encapsulated electrical components having a generally cylindrically shaped body portion with terminal leads extending therefrom, the steps of positioning the body portion of an unencapsulated component relative to a mold cavity surface and the terminal leads thereof relative to the cavity defining mold walls by interposition of end walled terminal lead positioning semi-cylindrically shaped partial sleeve of insulating material intermediate said component and the mold cavity surface of a thickness at least equal to the minimal desired depth of encapsulation, closing said mold by superposition of a complementally shaped mold cavity surface thereover and introducing compatible liquid encasing material into said mold to fill all voids therewithin and to merge, upon solidification thereof, with said sleeve of insulating material to form a unitary enclosed casing having said component substantially uniformly centered therewithin.

References Cited by the Examiner
UNITED STATES PATENTS

| 2,358,259 | 9/1944 | Siedschlag et al. | 18—59 |
| 2,674,646 | 4/1954 | Schoch | 18—59 |
| 2,687,626 | 8/1954 | Bartlowe | 29—155.63 |
| 2,704,880 | 3/1955 | Brennan | 18—59 |
| 2,836,805 | 5/1958 | Goldsmith | 18—59 |
| 2,894,316 | 7/1959 | Genovese | 174—52.6 |
| 2,943,359 | 7/1960 | Sussman | 18—59 |

FOREIGN PATENTS

| 66,972 | 6/1948 | Denmark. |
| 570,067 | 2/1933 | Germany. |
| 657,821 | 9/1951 | Great Britain. |
| 305,554 | 5/1955 | Switzerland. |

OTHER REFERENCES

Lutz, German printed application, N6225, March 1, 1956, 18–59 (3 pp. spec.; 1 sht. dwg.).

ROBERT F. WHITE, *Primary Examiner.*

WILLIAM STEPHENSON, MICHAEL V. BRINDISI, MORRIS LIEBMAN, *Examiners.*